United States Patent [19]

Pariani et al.

[11] Patent Number: 5,046,089
[45] Date of Patent: Sep. 3, 1991

[54] SUBSCRIBER LINE INTERFACE CIRCUIT WITH POWER-DOWN MODE

[75] Inventors: Angelo Pariani, Novara; Walter Rossi; Vanni Saviotti, both of Milan, all of Italy

[73] Assignee: SGS-Thomson Microelectronics S.r.L., Milan, Italy

[21] Appl. No.: 422,892

[22] Filed: Oct. 18, 1989

[30] Foreign Application Priority Data

Oct. 31, 1988 [IT] Italy ................ 22474 A/88

[51] Int. Cl.⁵ .......................................... H04M 4/00
[52] U.S. Cl. .................................. 379/399; 379/413
[58] Field of Search .............. 379/413, 399, 324, 377, 379/322

[56] References Cited

U.S. PATENT DOCUMENTS 4,419,542 12/1983 Embree et al. ................ 379/413 X
4,908,856 3/1990 Poletto ............................ 379/413

FOREIGN PATENT DOCUMENTS 0251038 6/1987 European Pat. Off. .
A/8721719 8/1987 Italy .

Primary Examiner—James L. Dwyer
Attorney, Agent, or Firm—Rosen, Dainow & Jacobs

[57] ABSTRACT

A method of lowering the power absorbed by an interface circuit, in the "power-down" state thereof, as incorporated to a telephone exchange and connected to a telephone subscriber line, being of a type which comprises a monitoring circuit portion connected between the line and the exchange. The method involves the steps of, detecting the polarization level of a conductor in the line, comparing that level with a reference value by means of a comparator having an input connected to the line and an output connected to the input of the monitoring circuit portion, switching the interface circuit to a standby state on a higher level than the reference value being sensed, once again detecting the polarization level of the line, this time through the interface circuit, and activating the telephone exchange when, on completion of the second detection step, the polarization level stays above the reference value.

6 Claims, 2 Drawing Sheets

SUBSCRIBER LINE INTERFACE CIRCUIT WITH POWER-DOWN MODE

DESCRIPTION

This invention relates to a method of lowering the power absorbed by an interface circuit in the "power-down" state thereof, as incorporated to a telephone exchange and connected to a telephone subscriber line, said circuit being of a type which comprises a monitoring circuit portion connected between said line and said exchange.

The invention also concerns a circuit device operating in accordance with the above method.

BACKGROUND OF INVENTION

As is known, numerical switching telephone exchanges or private branch exchanges of the digital type, the so-called PABX's (Private Automatic Branch Exchanges), incorporate integrated interface circuits adapted to drive the voice transmissions over plural telephone subscriber lines.

Such integrated interface circuits, e.g. of the kind referred to in the pertinent art as SLIC's (Subscriber Line Interface Circuits) and manufactured by the Applicant, are arranged to intervene between the telephone subscriber lines and the remaining circuitry internal to the exchange, and operative to supply given line voltage and current to the telephone line according to the resistive load on the line.

Each integrated circuit of the SLIC type comprises a first, high-voltage (up to about 140 Volts) circuit portion, connected directly to the subscriber line, and a second, low-voltage (up to 10 Volts) monitoring circuit portion which is connected between the first portion and the remaining circuitry internal to the exchange.

That second circuit portion is intended for monitoring the operation of the first circuit portion, and also operates in bi-directional communication with the exchange internal circuitry to receive and transmit both analog and digital signals relating to the subscriber's telephone messages or to the state of the line or to a state to be acquired by the interface circuit itself.

More specifically, most of the information transmitted by the SLIC integrated circuit to the exchange relate to the state of the line, and may be:

line "off-hook" on account of a subscriber having raised the receiver from its corresponding telephone set;

Line "on-hook", i.e. with the receiver down onto the associated telephone set.

Since in general, roughly 90% of the telephone lines which lead to one exchange would be in the "on-hook" state, there exists a definite demand for minimizing the power absorbed in such "power-down" state by interface circuits of the SLIC type, since these circuits absorb power in definitely larger amounts than the traditional transformer or relay devices which they have supplanted.

To meet this demand, the prior art has proposed a first solution providing for de-activation of the high-voltage circuit portion of the interface circuit with the telephone line in the "on-hook" state, e.g. as described in German Patent Application No. P3621890.1.

However, this prior solution has a drawback in that the function of the SLIC interface circuit is also de-activated in consequence, thereby it becomes impossible to recognize a state newly acquired by the telephone line.

It should be also noted that for such interface circuits of the SLIC type there are four operating modes or states possible, as specified herein below.

A first operating state, referred to as the tone state, is activated by the monitoring circuit portion where a calling signal is to be supplied on the line.

A second operating state, or communication state, is enabled during a phone call, in which case a cross current will appear on the line which is sensed by the interface circuit to identify the "off-hook" state of the line.

A third operating state, or standby state, characterized by a lower power consumption than the previous communication state, is activated with the line in the "on-hook" state. In this third operating state, the single operation performed by the interface circuit will be the detection of the telephone line state in order to possibly change over to the communication operating state.

Lastly, a so-called "power-down" state which cuts down the power consumption to almost zero, the line state (on/off-hook) sensing circuit being also de-activated.

Accordingly, in order to minimize the amount of power absorbed by the interface circuit, while ensuring detectability of the operational conditions of the telephone line, a further solution has been proposed, as disclosed in commonly-owned Italian Patent Application No. 21719-A/87, of which one of us is a joint inventor.

The last-mentioned Application discloses the structure of a line state monitoring circuit, incorporated to the telephone exchange but structurally independent of the interface circuit. By programming the interface circuit for the "power-down" state, the "on/off-hook" states of the line can be detected by that external monitoring circuit.

This prior solution, while substantially achieving its object in the instance of private branch exchanges, does involve increased complexity for the circuits and bears considerably on the procedure for handling messages pertaining to the line state to be addressed to the telephone exchange, which will receive information of the same or complementary type from two discrete circuits, i.e. the monitoring circuit and the SLIC interface circuit.

SUMMARY OF INVENTION

The technical problem that underlies this invention is to provide a method of lowering the power absorbed by the interface circuit, which can also overcome the drawbacks mentioned above in connection with the prior art.

This problem is solved by a method as indicated being characterized in that it comprises the steps of, detecting the polarization level of at least one conductor in the line, comparing said level with a reference value by means of a comparator having an input connected to the line and an output connected to said monitoring circuit portion, switching the interface circuit to a standby state, and once again detecting the polarization level of the line through the interface circuit.

The invention is also concerned with a circuit device for lowering the power absorbed by an interface circuit in the "power-down" state thereof, as incorporated to a telephone exchange and connected to a telephone subscriber line, said circuit being of a type which comprises a monitoring circuit portion connected between said line and said exchange, characterized in that it comprises a comparator having one input connected to a reference voltage pole and the other input connected to a conductor in said line via a resistor into which a reference current is injected, the comparator output being connected to the input of said monitoring circuit portion.

The features and advantages of the method according to this invention will become apparent from the following detailed description of a circuit device for the implementation thereof, given by way of illustration and not of limitation with reference to the accompanying drawings.

DETAILED DESCRIPTION OF PREFERRED EMBODIMENT

Figure 1:
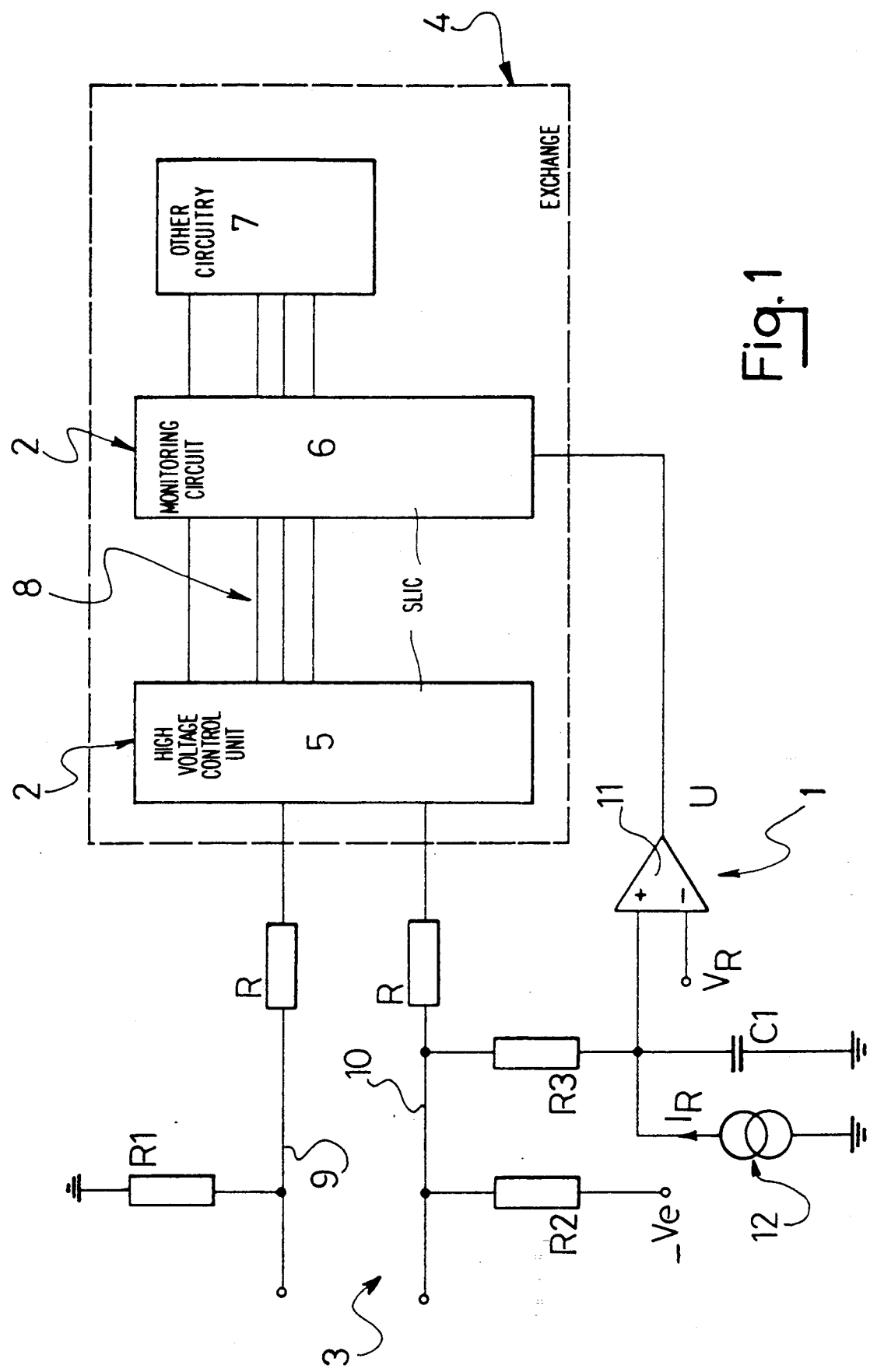
FIG. 1 shows diagrammatically a circuit device for implementing the method of this invention.

With reference to the drawing figures, generally and schematically indicated at 1 is a circuit device for lowering the power absorbed by an interface circuit 2, in the "power-down" state thereof, as incorporated to a telephone exchange 4 and connected to a telephone subscriber line 3.

The interface circuit 2 is of a type known in the trade by the name of SLIC (Subscriber Line Interface Circuit) and manufactured by this same Applicant.

The telephone line 3 is a double-wire line comprising a conductor pair 9 and 10; in addition, it is connected at one end to a subscriber telephone set, not shown because known per se, and at the other end to the exchange 4.

In particular, the interface circuit 2 comprises a first, high-voltage circuit portion or control unit 5 having a pair of inputs, each connected to a corresponding conductor 9 and 10 in the line 3 via a resistor R, and a second, low-voltage monitoring circuit portion 6 which is connected between the first portion 5 and the remaining circuitry, indicated at 7 and incorporated to the exchange 4.

Said first 5 and second 6 circuit portions of the interface circuit 2 are interconnected by conductors 8 arranged to transfer data and transmit activation and de-activation signals for that high-voltage circuit portion 5.

Furthermore, the first or TIP conductor 9 of the double-wire line 3 is connected to ground through a resistor R1 having a resistive value of 40 kOhms, and the second or RING conductor 10 is connected to a negative supply pole VE at −48 Volts, via a resistor R2 having a resistive value of 40 kOhms.

The circuit device 1 according to the invention comprises a comparator 11 having its inverting input connected to a reference voltage pole VR and the other, non-inverting input connected to the conductor 10 in the line 3 via a resistor R3 into which a reference current Ir is injected which is provided by a current source 12 connected between ground and the non-inverting input of the comparator 11. Illustratively, the resistor R3 may have a resistive value of 1.5 megaohms, and reference current Ir may be 20 microamperes.

In addition, a 100-nanofarad capacitor C1 is advantageously connected between the non-inverting input of the comparator and ground, in parallel to the current source 12, to increase the device responsiveness to common mode alternating currents.

The comparator 11 has an output U connected to the input side of the second circuit portion 6 of the interface circuit 2.

The method of this invention will be now described, making reference to an initial state whereby the interface circuit is in the inactive "power-down" state and the monitoring portion 6 is thus unable to detect an "off-hook" condition.

The resistors R1 and R2 provide polarization for the line conductors 9 and 10, whilst the resistor R3 supplies the non-inverting input of the comparator with a voltage dependent on the voltage of the RING conductor 10 in the line 3.

In the "on-hook" condition of the line, the voltage at the non-inverting input of the comparator will be positive, but if the user picks up the receiver to make a call, this voltage level becomes negative to allow the comparator to recognize the now "off-hook" condition.

The comparator 11 can, therefore, sense the polarization level on the conductor 9 and compare this level to the level of the reference voltage VR.

On that reference level being exceeded, the signal from the comparator will be input to the monitoring portion 6 of the interface circuit, which will activate the circuit 2 to take the "standby" operating state and thus wake-up and restore the monitoring portion. At this time, a second check of the line polarization level is performed through the interface circuit 2. Now, the monitoring portion 6 in its "standby" mode can react and switch the interface circuit into its first or second states.

Figure 2:
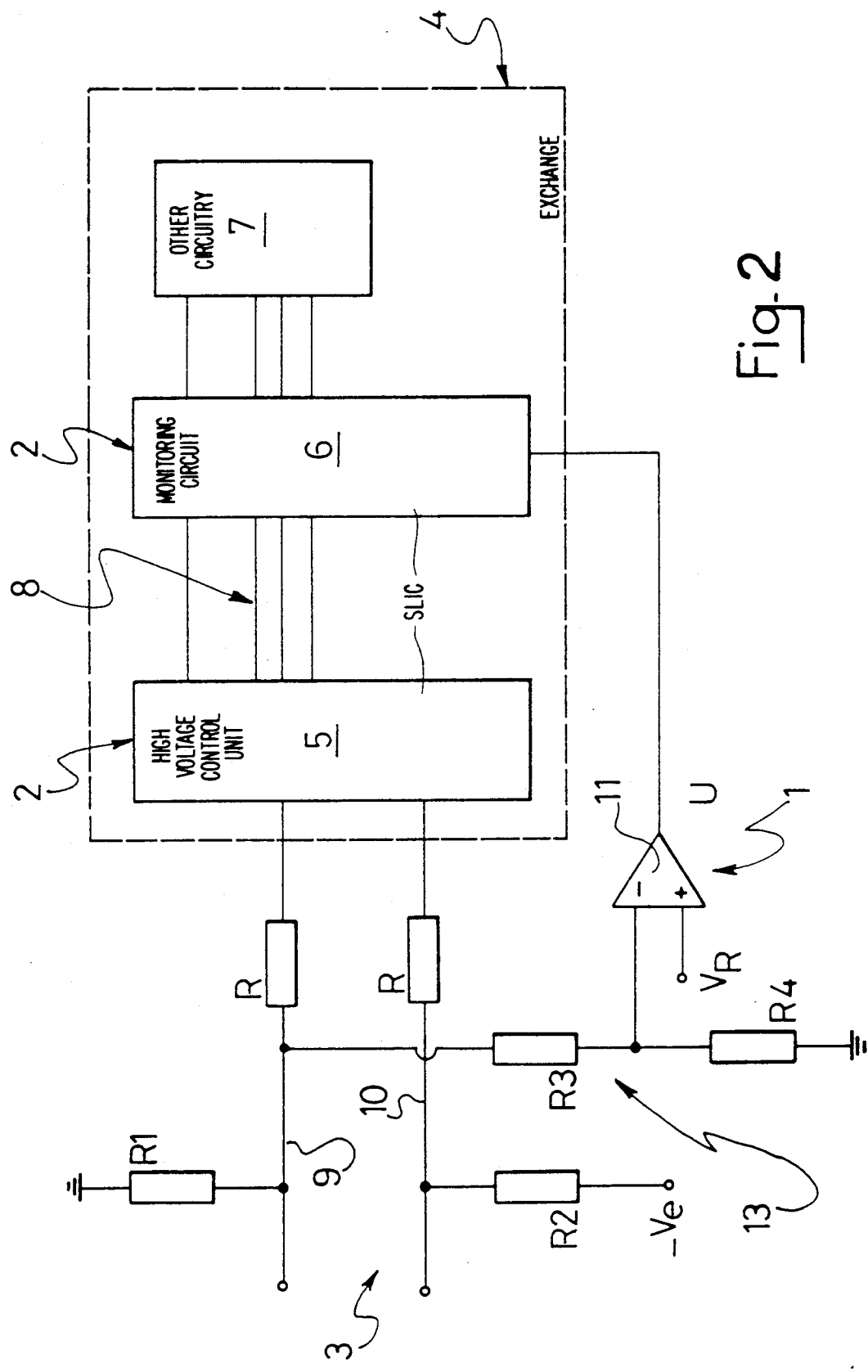
FIG. 2 shows a modified embodiment of the circuit device shown in FIG. 1.

A modified embodiment of the inventive circuit device will be now described with specific reference to FIG. 2. In this modified embodiment, cooperating parts and items which are similar in construction and operation to those of the embodiment previously discussed are denoted by the same reference numerals.

In this embodiment, the circuit device 1 comprises a comparator 11 having its non-inverting input connected to the reference voltage pole VR and its inverting input connected between ground and the conductor 9 in the line 3 via a voltage divider 13. In particular, the voltage divider 13 comprises the resistor R3 connected between the conductor 9 and the inverting input of the comparator 11, and a resistor R4 connected between said inverting input and ground.

Whereas the resistors R1 and R2 provide polarization of the line conductors 9 and 10, the resistors R3 and R4 supply the comparator inverting input with a voltage dependent on the voltage of the TIP conductor 9 in the line 3.

The operating method of the circuit device according to this modified embodiment is quite the same as described in connection with the previous embodiment.

In the former case, the comparator 11 will operate on reception of the signal from the resistor R3, connected to one line terminal, into which the reference current Ir is injected; in the latter case, the comparator 11 will receive the signal from the resistive voltage divider 13 connected between a line terminal and ground.

Thus, it may be appreciated that the input signal to the comparator 11 may be supplied independently from either or both terminals of the line 3.

It is noted that in the instance of public exchanges a detection of "on/off-hook" states of the line, as based on measuring the line cross current, may be occasionally compounded by the appearance of a longitudinal disturbing current, for example, as induced by power lines lying in the proximities of the telephone lines.

The comparator 11 is responsive to voltage variations due not only to the cross currents but also to longitudinal ones, and could, therefore, activate the interface circuit switching also on account of a mere disturbance on the line.

However, the interface circuit is in itself capable of checking the polarization level on the line, and the telephone exchange 4 will be only activated where the "off-hook" condition of the line has been confirmed.

By contrast, where the "off-hook" state of the line is unconfirmed, the interface circuit 2 will remain in the "standby" state for a short time not exceeding 1-2 seconds, and thereafter return automatically to the "power-down" state.

Thus, the method of this invention affords the ability to considerably lower the power absorbed by the interface circuit with the telephone line in the "on-hook" state.

In addition, the circuit device for implementing the inventive method has an unusually simple structure, and may be integrated to the interface circuit, if desired.

I claim:

1. A method of lowering the power absorbed by an interface circuit, when in its inactive power-down state thereof, as incorporated to a telephone exchange and connected to a telephone subscriber line while retaining the ability to activate the exchange in response to a change in the state of the subscriber line, said interface circuit being of a type which comprises a monitoring circuit portion connected between said subscriber line and said exchange, characterized in that it comprises the steps of, detecting the polarization level of at least one conductor in the subscriber line, comparing said detected level with a reference value by means of a comparator having an input connected to the line and an output connected to said monitoring circuit portion, in response to the output of said comparator changing, switching the interface circuit from its power-down to its standby state, and once again detecting the polarization level of the subscriber line directly through the interface circuit while in its standby state without the aid of the comparator.

2. A method according to claim 1, characterized in that said telephone exchange is activated to a tone or communication state upon a predetermined line polarization level being sensed by said interface circuit.

3. A circuit device for lowering the power absorbed by an interface circuit, when in its inactive power-down state thereof, as incorporated to a telephone exchange and connected to a telephone subscriber line, said circuit being of a type which comprises a monitoring circuit portion connected between said subscriber line and said exchange, said monitoring circuit portion having an input for switching the interface circuit from its inactive power-down state to its standby state wherein the monitoring circuit portion becomes active, characterized in that it comprises a comparator having one input connected to a reference voltage pole and another input connected to a conductor in said subscriber line via a resistor into which a reference current is injected, the comparator output being connected to the said input of said monitoring circuit portion.

4. A device according to claim 3, characterized in that a current source is connected between ground and the said other input of the comparator.

5. A device according to claim 4, characterized in that a capacitor is connected in parallel to said current source.

6. A circuit device for lowering the power absorbed by an interface circuit, when in its inactive power-down state thereof, as incorporated to a telephone exchange and connected to a telephone subscriber line, said circuit being of a type which comprises a monitoring circuit portion connected between said subscriber line and said exchange, said monitoring circuit portion having an input for switching the interface circuit from its inactive power-down state to its standby state wherein the monitoring circuit portion becomes active, characterized in that it comprises a comparator having one input connected to a reference voltage pole and another input connected between one conductor in said subscriber line and ground via a resistive voltage divider, the comparator output being connected to the said input of said monitoring circuit portion.

* * * * *